United States Patent [19]

Poynor

[11] Patent Number: 4,832,263

[45] Date of Patent: May 23, 1989

[54] SELF PROPELLED FIELD IRRIGATOR

[76] Inventor: Russell R. Poynor, 122 Country Club Pl., Geneva, Ill. 60134

[21] Appl. No.: 116,892

[22] Filed: Nov. 5, 1987

[51] Int. Cl.$^4$ ............................................. B65H 75/26
[52] U.S. Cl. .................................... 239/197; 239/198; 239/723; 242/54 R
[58] Field of Search ........................ 239/736, 195–198, 239/723; 242/54 R, 86.5 R; 415/116

[56] References Cited

U.S. PATENT DOCUMENTS

| 1,340,884 | 5/1920 | Freeman | 242/54 R X |
| 2,974,876 | 3/1961 | Poynor et al. | 239/736 X |
| 3,942,722 | 3/1976 | Ede | 239/736 X |
| 4,142,825 | 3/1979 | Koeller | 415/116 |
| 4,234,019 | 3/1988 | Eberhardt | 415/116 X |
| 4,502,834 | 3/1985 | Jackson | 415/116 X |
| 4,709,860 | 12/1987 | Patrick et al. | 239/654 |

Primary Examiner—Andres Kashnikow
Assistant Examiner—Kevin P. Weldon
Attorney, Agent, or Firm—John J. Kowalik

[57] ABSTRACT

A mobile irrigator with a ribbon of plastic wound on a drum which is frictionally driven by wheels engaged with the ribbon, the wheels being adapted to slide on the plastic to compensate for varying diameters of the drum resulting from more or less windings of the ribbon, the drive for the drum being designed to hold the ribbon taught for passing through guides which shape the ribbon from flat to tube and vice versa. A control is provided for the pump to prevent loss of prime by limited feeding of air into the pump. A supply source of water has an electronic monitoring receiver operating a supply pump discharging into the tube to provide sufficient pressure and attendant fluid level to hold the prime in the irrigator or discharge pump. A pressure sensitive sending command unit is provided at the inlet of the irrigator pump for actuating the supply pump at the water source.

25 Claims, 6 Drawing Sheets

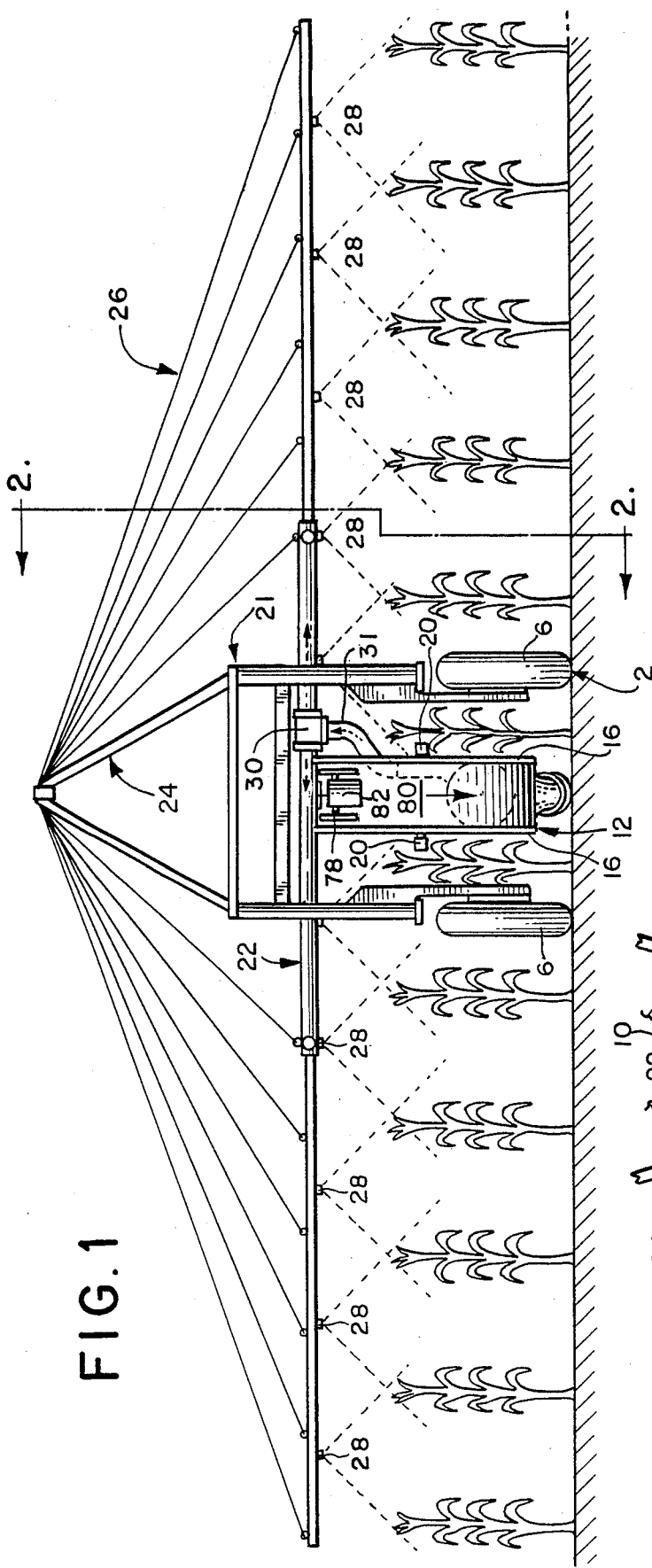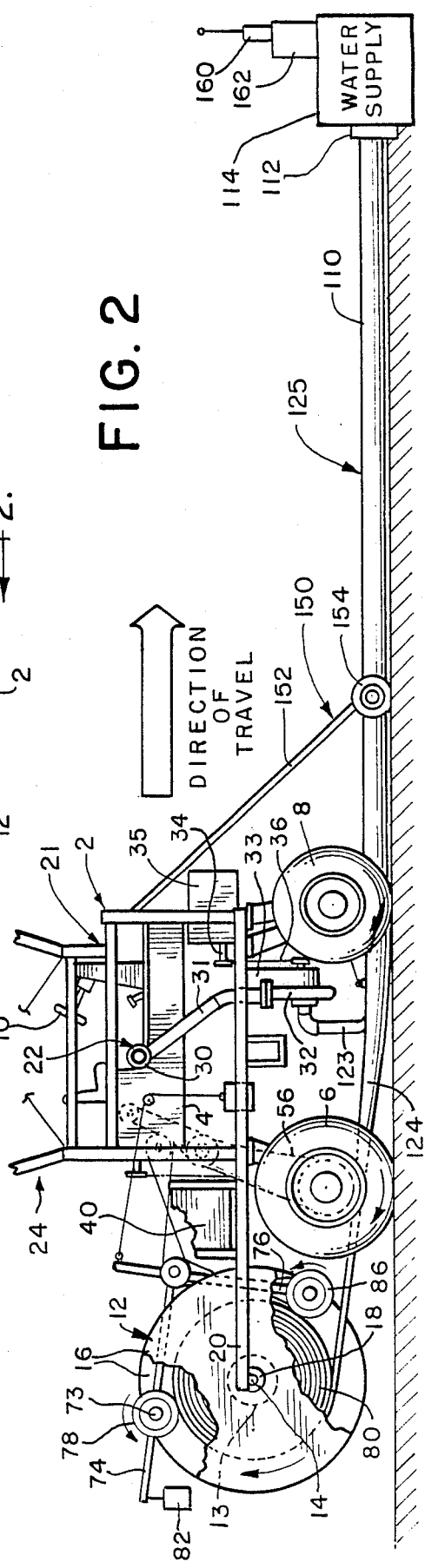

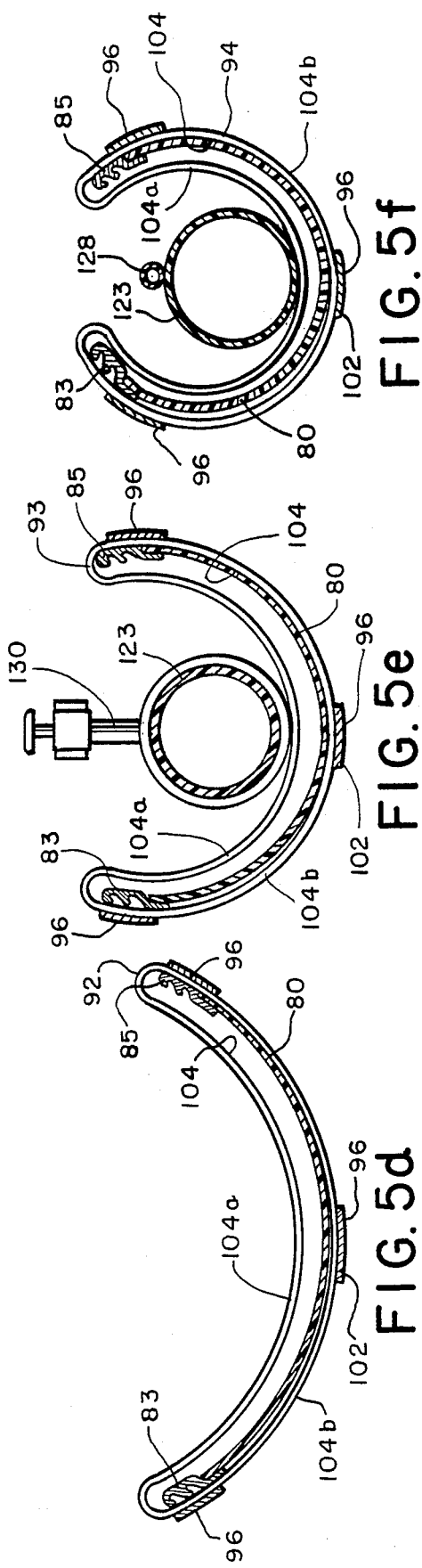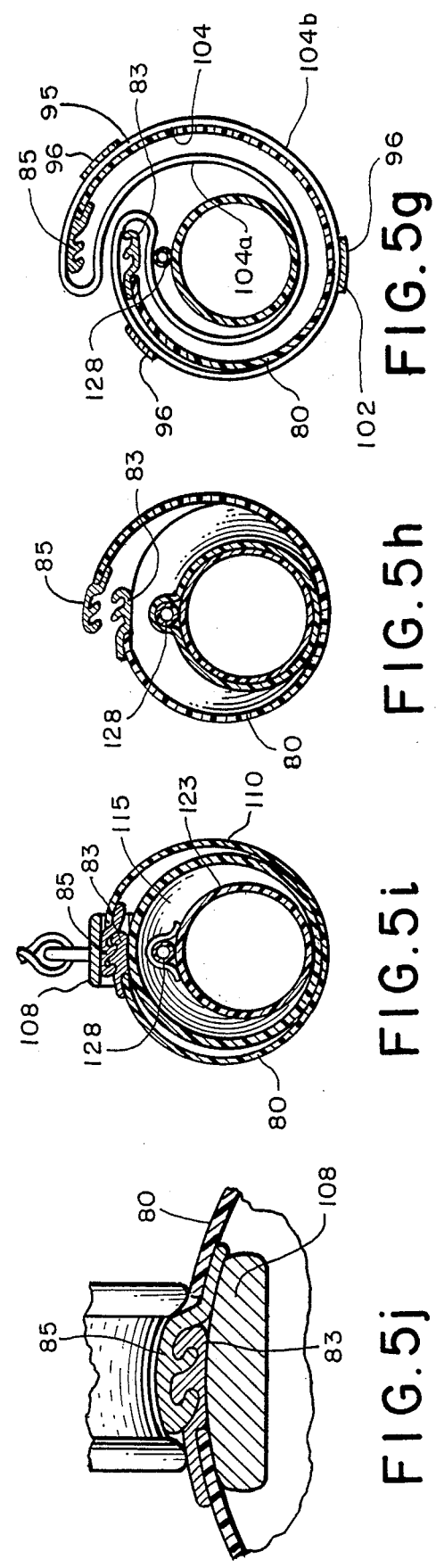

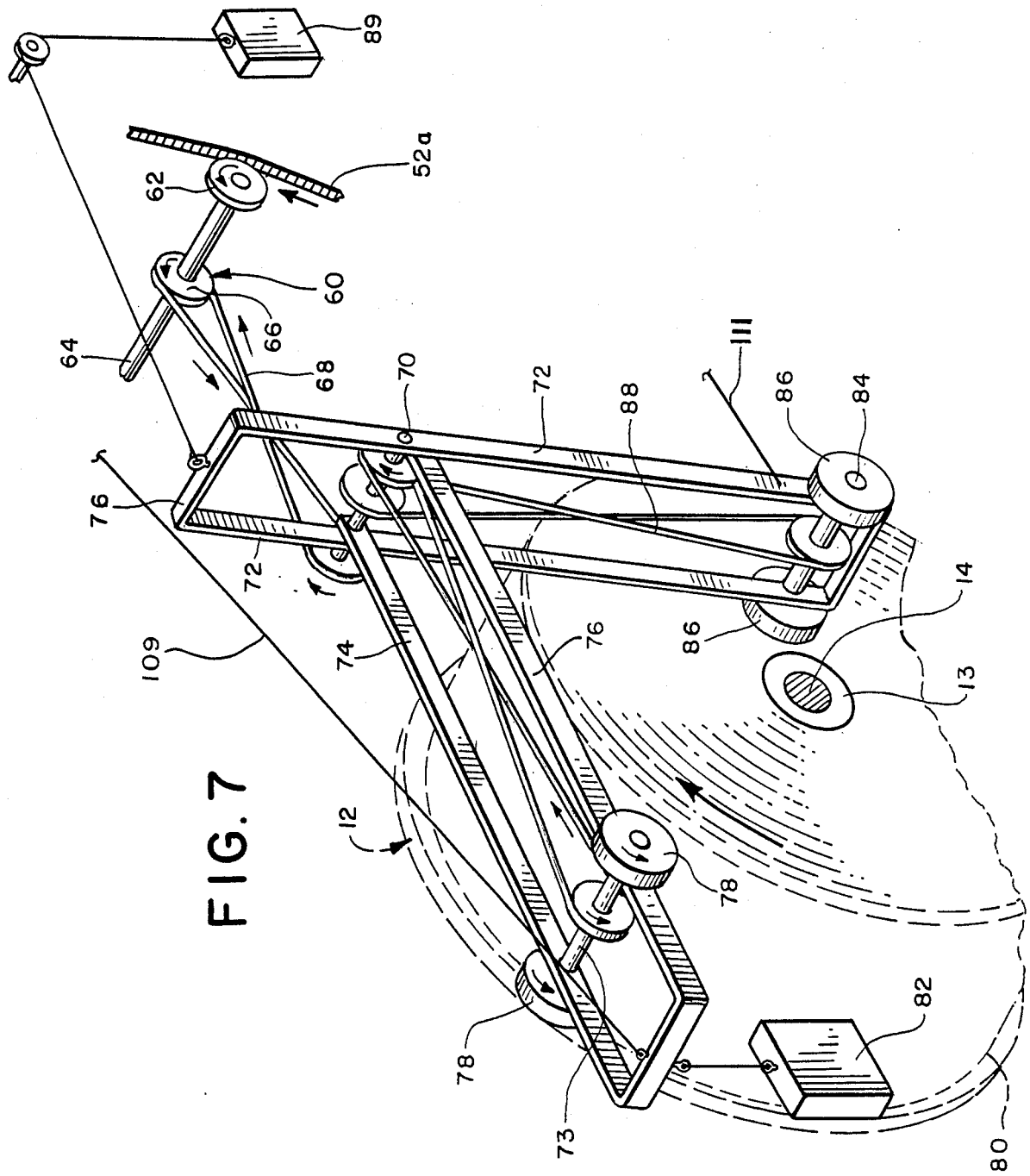

SELF PROPELLED FIELD IRRIGATOR

BACKGROUND OF THE INVENTION

This invention relates to irrigation apparatus and more particularly to apparatus which is adapted to traverse a field of growing crops with minimal injury to the crops while dispensing an adequate quantity of water.

The best know prior art utilizes a tractor for pulling a hose or the tractor is used to pull a hose-carrying trailer. The hose is usually a high pressure type and is very heavy and bulky so as the field gets wet, the equipment becomes mired in the field of mud and is difficult to transport, particularly when the hose coiled on a drum is full of water.

My prior U.S. Pat. Nos. 2,974,876 and 2,718,433 alleviate some of the problems of hose transport. The earlier patent discloses a ditch or terrace channel which is filled with water from one end and a boomcarrying irrigator runs along the ditch and pumps the water into the boom. A short piece of plastic or canvass is dragged behind the tractor forming a moving dam behind which the water is pumped. The later patent uses a strip of plastic which is carried flat on a drum from a tractor and is zippered as it unwinds to form a low-pressure water holding tube from which the water is drawn by a pump and discharged through nozzles and the like carried by the tractor.

DISCUSSION OF THE PRIOR ART

The problem with the structures heretofore described without using a hose, is that in one a ditch or channel must be present in the field.

In the later patent the structure shown is illustrative of the principle, but does not specifically teach how to shape the tube for closing and water removal or the mechanism for insuring that the rate of winding of the plastic would correlate to ground speed of the unit since the diameter of the reel with overlapping layers of plastic is constantly changing.

Also techniques for water removal and coordination of the supply pump with the discharge pump is now envisioned.

SUMMARY OF THE INVENTION

This invention is directed to a novel self-propelled irrigator which mounts a water distributor boom or high pressure nozzle and also a reel for taking-up and discharging a ribbon of tube-forming plastic material and wherein a novel self-compensating friction drive is provided to wind the ribbon.

The invention contemplates mounting a reel on the tractor and frictionally driving the reel through the ribbon as it winds onto the reel at a speed slightly in excess of ground speed so that a tugging action accrues on the ribbon, the excessive speed of the friction drive being dissipated by slippage of the drive against the plastic through which it is driving the drum or reel.

Another object is to provide a novel forming guide arrangement for the plastic strip to flatten it out into a ribbon preparatory to its being wound onto the drum and during unwinding shaping the flat ribbon into a trough shape and then into a tube so that the transition from one shape to another is easily facilitated.

A different object is to provide a control for regulating the flow of fluid from the tube into the pump so as not to exhaust the quantity of water to a point where the pump would have to be reprimed.

A still further object is to provide novel means for inhibiting overflow of water from the open end of the tube.

These and other objects and advantages inherent in the invention will become more readily apparent from the specification and the drawings wherein:

FIG. 1 is an end view of the apparatus;

FIG. 2 is a side elevational view taken partly in section on line 2—2 of FIG. 1 on a smaller scale showing the unit moving in a sprinkling condition;

FIGS. 5a-5j are crossectional views taken on lines 5a-5j of FIGS. 4 and 6 showing the various guides;

FIG. 7 is a perspective view of the reel drive.

DESCRIPTION OF THE INVENTION

Figure 3:
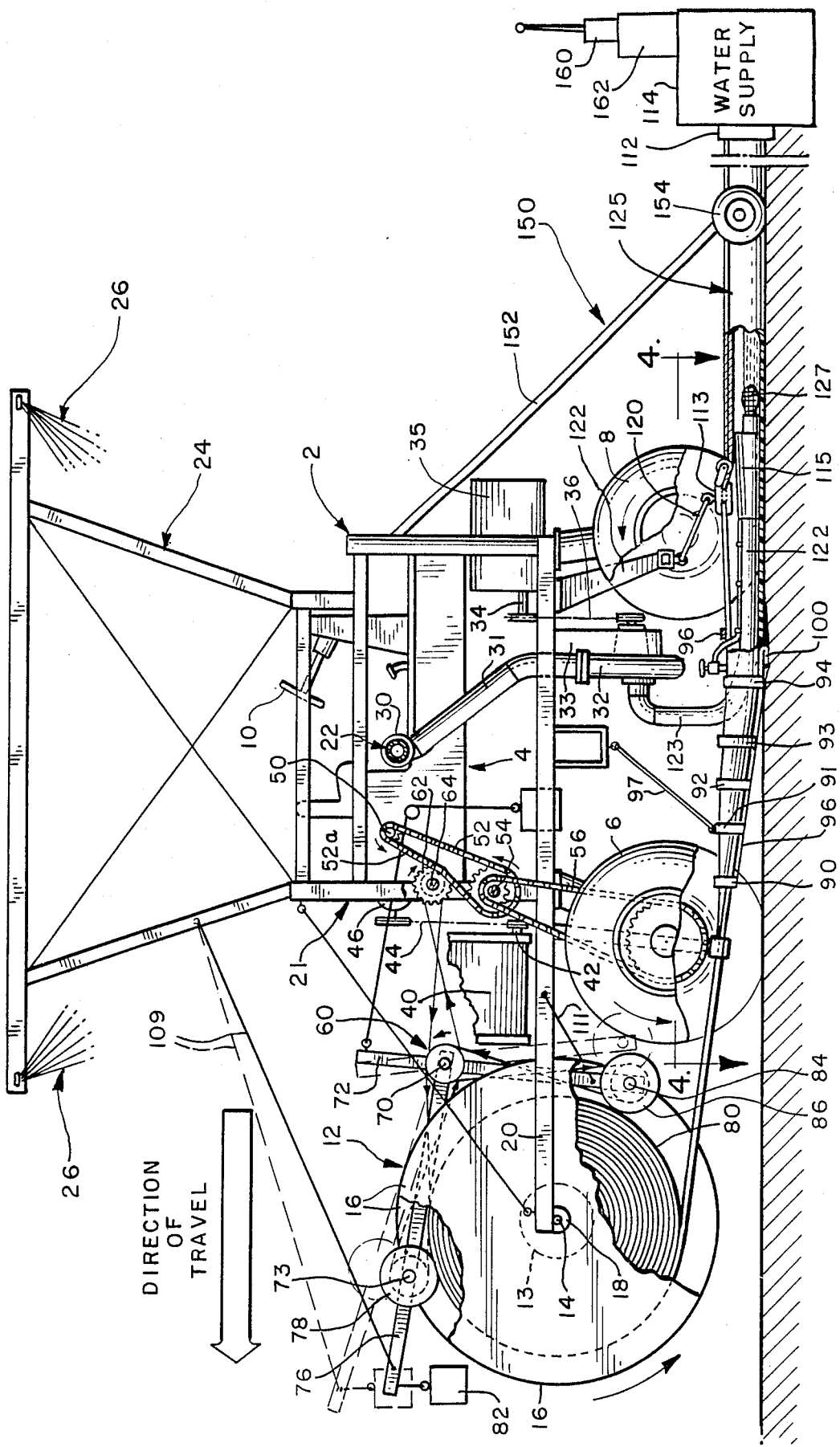
FIG. 3 is an enlarged side elevational view showing the unit moving to a preparatory position and unwinding the reel.
Figure 4:
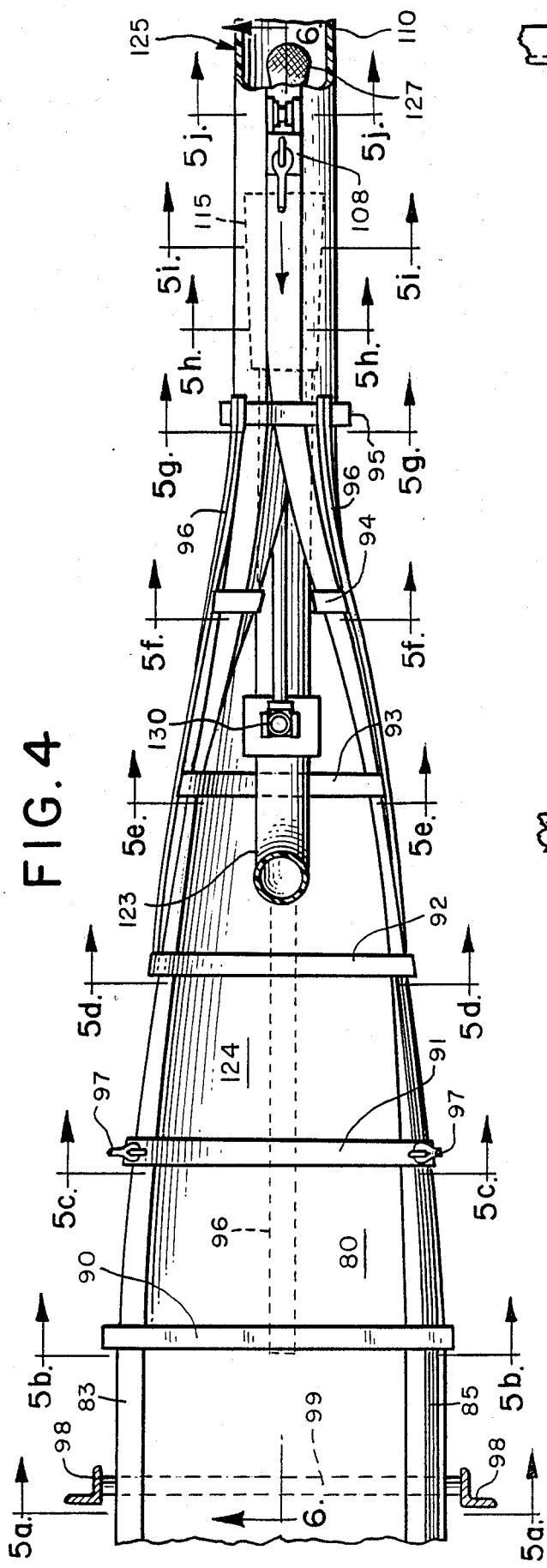
FIG. 4 is an enlarged sectional view taken substantially on line 4—4 of FIG. 3.

Describing the invention in detail and having particular reference to the drawings, there is shown an ambulatory carrier or tractor 2 including a longitudinal body 4 with a pair of traction wheels 6,6 at one end and a pair of turning wheels 8,8 at the other end coupled to a steering wheel 10 in well-known manner.

The carrier mounts at one end outwardly of the traction wheels 6,6 a drum or reel 12 having a center core 13 incorporated with a drive axle 14 which adjacent to its opposite ends is secured to annular end plates 16,16 and is mounted in bearings 18,18 from the ends of a pair of flanking beam members 20,20 of a frame 21. The beam members 20,20 are located at opposite sides of the body 4.

The beam members 20,20 are integrated with a carrier or mounting A frame 21 which intermediated its ends supports a transeverse boom 22. The frame also forms an upwardly extending mast 24 which provides an anchor for a plurality of guy wires 26,26 which are attached at selected intervals to the boom along the length thereof.

The boom carries a plurality of sprinkler heads 28,28 which are connected by a pipe or hose 31 to the outlet port or discharge of a pump 32.

The pump is mounted in any well known manner beneath the tractor body as by a standard 33 and is driven from an output shaft 34 of an engine 35 supported by a frame structure 36 from the tractor body 4.

The traction wheels 6,6 are driven from a tractor engine 40 which is mounted at the rear of the tractor body aft of the wheels 6. The engine 40 has an output shaft 42 which drives a chain and sprocket drive 44 of a transmission 46. The output shaft 50 of the transmission extends transversely of the tractor and has its ends at opposite sides thereof. Each end of the shaft 50 drives a chain and sprocket drive 52 which in turn drives a reduction drive 54 which drives a chain and sprocket drive 56 coupled to the adjacent traction wheel 6. Thus depending upon how the transmission is set the tractor will move forward or rearwardly.

The driving train to the traction wheels is coupled with a drum or reel drive generally designated 60. The chain 52a of the drive 52 has a portion wrapped about sprocket 62 of the drum drive. Sprocket 62 is mounted on a cross-shaft 64 journalled on the adjacent portions of the tractor body or frame. The shaft 64 is connected to a cog wheel or sprocket 66 which in turn drives a counter-shaft 70.

The shaft 70 is rotatably carried by a pair of arms 72 mounted on the tractor and serves as a common pivot for a pair of carrier frames 74,76 about a horizontal axis parallel with the center shaft of the drum.

The top frame 74 journals a counter-shaft 73 which drives a pair of friction wheeels 78 which in driving position rest upon a flat sheet or strip or ribbon of plastic 80 wound about the core of the drum. The frame 74 and thus the drive wheels carried thereby are biased downwardly toward the core of the drum by a weight 82 hung from the distal end of the frame 74. Of course, springs may be used to bias the frame by being hooked to the frame 74 and the A frame in appropriate manner.

The upright frame 76 has a counter-shaft 84 journalled thereon parallel with the core of the drum, The countershaft drives a pair of friction wheels 86,86 keyed thereto. The wheels 86,86 engage the plastic strip 80 and drive the drum therethrough, the wheels 86 and shaft 84 being driven a chain and sprocket or cog wheel and belt drive 88 extending between the shafts 84 and 70. The frame 76 and wheels 86 are biased toward the drum by a weight 89 suitably suspended from the tractor frame and cable-connected to the frame 76.

The plastic strip 80 has interlocking zipper ribs 83,85 along its longitudinal edges. The strip upon being withdrawn from the drum or being wound thereon is passed through a series of reforming guides 90,91,92,93,94,and 95 and form part of a steel cradle 96 which is rigid and is floatingly supported at one end adjacent to the drum as at 96a from dependent frame members 98,98 which also support a flat horizontal ledge 99 adjacent to the drum. The cradle is also suspended from the tractor by cables 97 connected to the guide 91.

The cradle slopes downwardly from end 96b where it is attached to the ledge, toward its other end whereat it has a shoe 100 which rides upon and is adapted to slide along the ground. The shoe is connected to a backbone member 102 which is connected on its top side with the ribs 90–95 which are spaced lengthwise thereof.

Figure 5A:
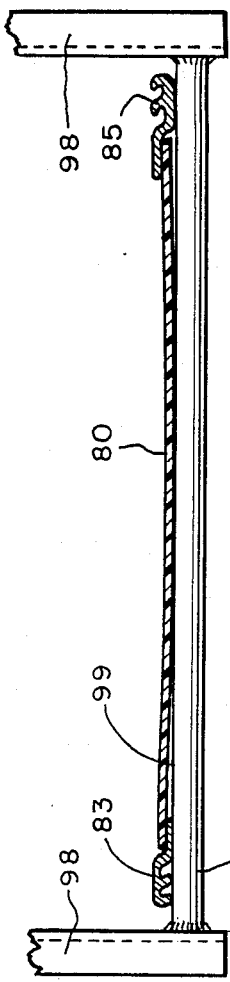
Figure 5B:
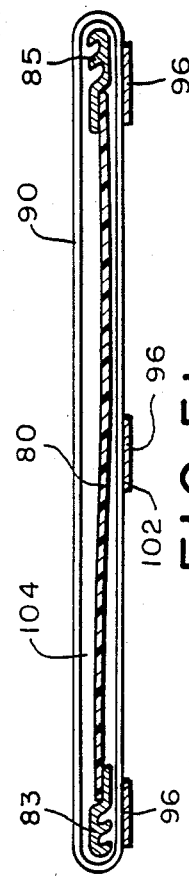

Each guide comprises a slot 104 defined by top and bottom concentrically curved elements 104a and 104b connected at their ends in vertically spaced relation by U. shaped junctures. Each successive guide beginning from 90 to 95 is curved more than the preceding one to form the strip from a flat ribbon to a tube and vice versa, The guide 95 at the end of the series positions the locking ribs in overlapping relation just prior to the strip passing through the zipper slide or closer 108 as seen in FIG. 5h and in FIGS. 5i and 5j whereat the ribs on one edge are pressed in between the ribs on the other edge of the strip so that the strip downstream of the slider exits as a tube 110. In preparation for irrigating a field, the distal end of the tube 110 is connected by a quick clamp 114 or otherwise to the outlet of a water supply source such as a low pressure pipe or tube laid along the edge of the field. The ground drive to the drum is disconnected by lifting the frames 74,76 and the friction drive wheels 78,86 mounted thereon from the plastic ribbon wound on the drum. Ropes 109 and 111 connected between the frames 74 and 76 and the carrier frame may be shortened and retied to hold the frames and wheels away from the drum. Alternatively, the ground drive may be disconnected to the drum at the transmission. The tractor is backed away from the water supplier in a path normal to the edge of the field, thus unwinding the strip from the drum and forming the tube as the strip passes through the guides. The ribs on the opposite edges of the strip are forced to mate. When the unit reaches the limit of the length of the strip, the tractor drive is reversed so as to proceed toward the source of water at a selected creeper speed and the pump 162 at the water source is started by remote control.

It will be understood that as the plastic strip is unreeled and zippered into a tube, the tube could be filling with water and by starting the discharge pump on the tractor irrigation could be performed. However, in order to have the tube filled with water to use for automatic guidance and not to be driving the tractor over wet ground it would be more desirable to irrigate while reeling up the tube.

To reduce, minimize or inhibit the overflow of water at the open end of the tube and to facilitate and holding a prime, a cone plug or stopper is fitted into the tube portion with the open end of the cone facing into the tube. The cone 115 is made of flexible plastic material, which about its periphery 116 at its open end 117, because of the pressure of the water filling the cone, tends to conform to the shape of the enclosing tube portion 110 and thus forms a stopper or plug. Also tensioning of the tube in the region of the plug tends to constrict the tube about the plug.

Slide 113 is swively mounted to one end of arm 120 which is similarly connected to arm 122 which is connected to the frame.

The pump has its inlet pipe 123 bent to fit into the trough section 124 of the water conductor generally designated 125. The pipe 123 extends into the formed tube portion 118 through the apex 126 of the cone and at its distal end has a screened head 127 to guard against the entry of any foreign material into the pump.

To prevent loss of prime in the pump should the water level drop in the portion of the tube 118 below the inlet pipe end, there is provided a bleeder line 128 which extends through the cone and is secured to the top of the inlet pipe 123 of the pump. Air is thus aspirated into the pump not enough for the pump to lose its prime but sufficient to reduce the pumping efficiency of the pump wherefor the pump draws less water so that the level of the water in the tube does not fall below the inlet end of the inlet hose 123. The volume of air is regulated by a valve 130 which is mounted on the inlet end portion of pipe 123 and discharges the air into the check valve C.V. near the pump. Thus, if the water head drops below the open end of the bleeder line, air is drawn into the inlet tube above the inlet end 132 of the inlet pipe, thus reducing the pumping rate of the pump until the water again fills the tube and inundates the open end of the air line.

Figure 5C:
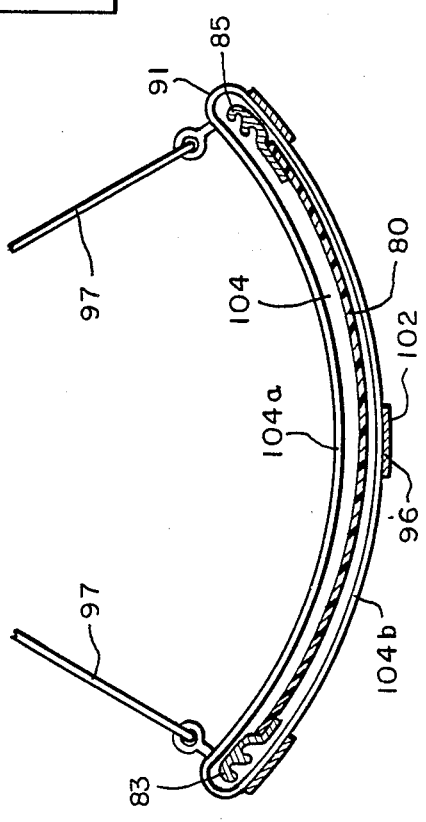
Figure 6:
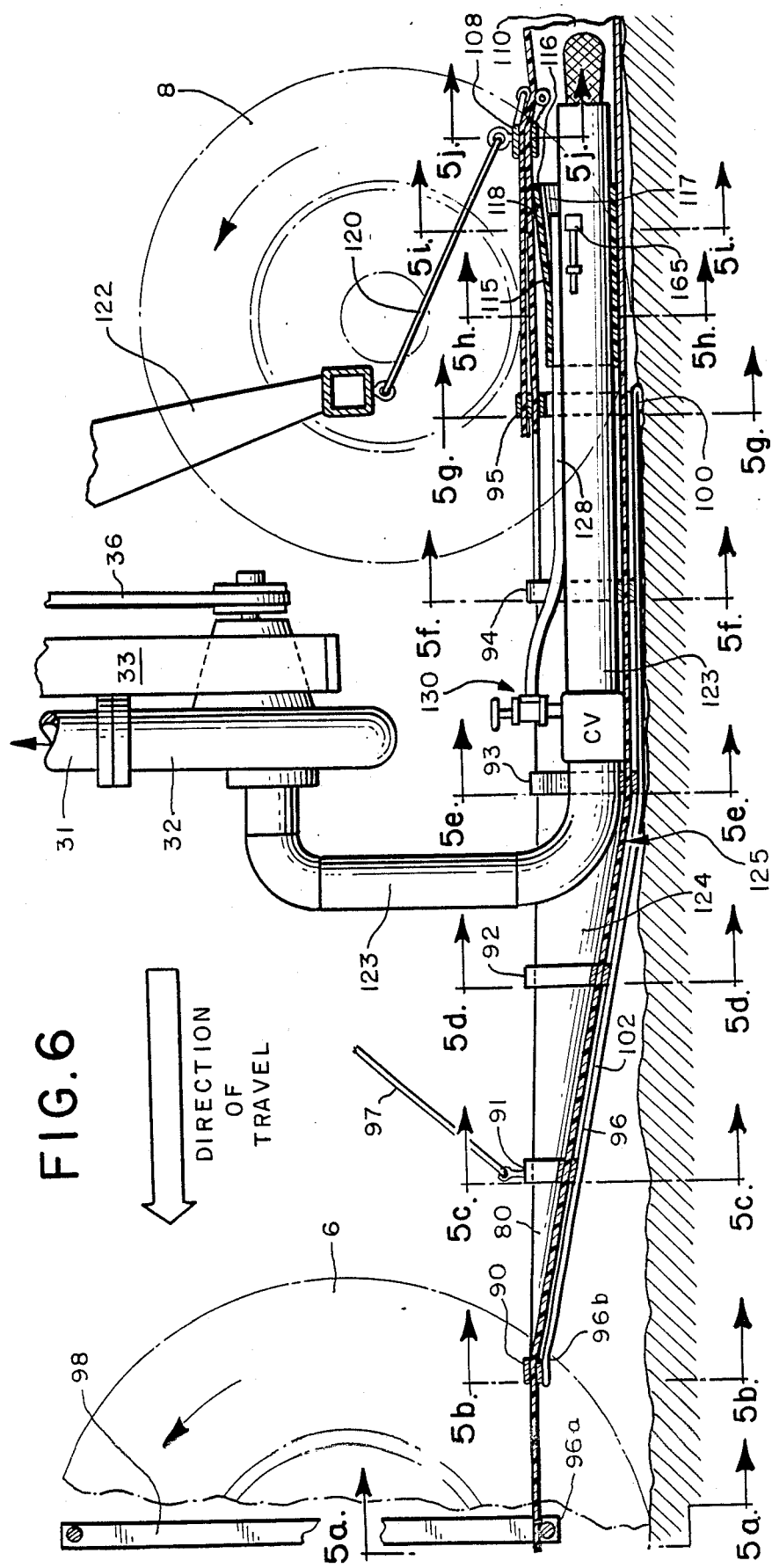
FIG. 6 is a perspective view of the pump control and water gate.
Figure 6A:
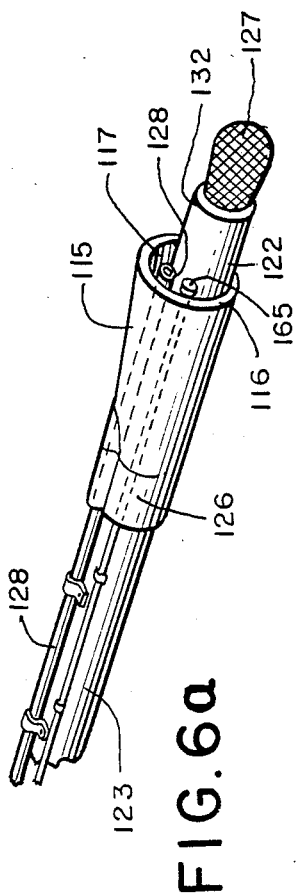
FIG. 6a is a perspective view of the slideable cone apparatus.

As heretofor stated, downstream of the zipper slide the tube unfolds and forms the trough section 124. The guide portion 95 FIG. 5g is shaped as a spiral of about 380° positioning the edges of the ribbon in overlapping relationship so that upstream they may easily pass through the zipper slide. The next guide 94 FIG. 5f is about 325° in the form of a C laid on its side. The following guide 93 is about 180° FIG. 5e is about a half circle generally in the form of a U. The next guide 92 FIG. 5d is a shallow curve of about 60° and the next guide 91 FIG. 5c is a shallower curve of about 30° and guide 90 is straight and the ribbon passing therethrough is completely unfolded. The guide 99 is a flat horizontal bar in the form of a ledge. The sheet or strip of plastic then winds onto the reel or the drum and is pulled in tension by the driving wheels 78,86.

It will be understood that the wheels 78,86 frictionally transmit drive to the strip and run slightly faster peripherally than ground speed of the unit so that the sheet is constantly held in tension. As the strip winds onto the drum the diameter of the drive surface becomes larger and larger and as the strip is paid out the diameter becomes smaller and smaller. The drive thereto is however self-compensatory since the material of the tape is plastic, the drive wheels slide against the surface of the tape more or less depending upon the peripheral speed at the particular instant. There is, however sufficient friction to continue the drive. The necessity for any complicated drive is obviated. Of course, when the tape is paid out the drive to the drum is disconnected either by disengaging the drive wheels or by declutching the transmission, that is to the drive wheels with respect to the drum.

It will be apparent that in lieu of the sprinkler boom, a rotating gun may be used or the boom may be perforated to discharge the water.

A steering mechanism 150 is positioned on the front end of the tractor comprising a steering arm 152 connected with the steering wheels at one end and connected to a guide wheel 154 riding alongside the tube 110.

In order to monitor the pumping rate of the water source supply pump 162 which may draw water from a pond or well, a receiver 160 is operatively connected to the governor assembly or throttle of the supply pump for suitably operating the same and a pressure sensitive sending unit 165 is mounted in cone 115. If the water level is low in the tube with attendant low pressure, the sending unit signals the receiver to run the supply pump faster and thus increase the flow rate of the supply pump. If the pressure becomes too high the sending unit directs the receiver to slow the supply pump and thus reduce the delivery rate to the tube 110.

I claim:

1. An irrigation unit comprising a mobile carrier having traction wheels,
   a drum supported on the carrier,
   a strip of plastic material adapted to be wrapped about the drum for transport and adapted to be unreeled and formed into a water-carrying tube for distribution over the terrain, and
   drive means providing a variable torque slip drive transmitted through said strip wound on the drum for automatically varying the speed of rotation of the drum in a direction wrapping the strip onto the drum as the strip-covered diameter of the drum increases to maintain constant tension on the strip.

2. The invention according to claim 1 and said traction wheels operatively connected with said drive means driving the drum, said drive means incrementally decreasing the speed of rotation of the drum as the peripheral wrap of the strip increases the diameter of the wrapping through which the drive is transmitted to rotate the drum.

3. The invention according to claim 1 and shaping means comprising a series of guides curved from a straight to a circular configuration in a direction away from the drum to form a tube from a flat strip, and each of said guides having spaced opposing portions of concentric configurations in certain locations embracing said strip, and means for locking the edges of said strip attendant to said strip being shaped into a tube,
   said guides being operative to hold said strip from advancing either edge longitudinally ahead of the other.

4. The invention according to claim 3, and means integrated with said guides and forming a cradle supported on the ground, and means for floatingly supporting the cradle for accommodating vertical movements thereof to facilitate its riding over varying terrain.

5. An irrigation unit comprising a mobile carrier having traction wheels,
   a drum supported on the carrier,
   a strip of plastic material adapted to be wrapped about the drum for transport and adapted to be unreeled and formed into a water-carrying tube for distribution over the terrain, and
   drive means for transmitting a drive through said strip to turn the drum in a direction wrapping the strip onto the drum,
   and said traction wheels operatively connected in consonant relation with said drive means for travel substantially proportional to the peripheral speed of the drum,
   and said drive means comprising driving wheels in frictional sliding engagement with the strip wound on the drum.

6. The invention according to claim 5 said drive means comprising frame means for supporting said driving wheels in positions circumferentially spaced about the drum, and means for biasing the frame means toward the drum for engaging the driving wheels with said strip, and
   means for disengaging said driving wheels from said strip.

7. An irrigation unit comprising a mobile carrier having traction wheels,
   a drum supported on the carrier,
   a strip of plastic material adapted to be wrapped about the drum for transport and adapted to be unreeled and formed into a water-carrying tube for distribution over the terrain, and
   drive means for transmitting a drive through said strip to turns the drum in a direction wrapping the strip onto the drum,
   and means for shaping said strip into a tube in one direction of movement of the carrier with attendant unwinding of the strip from said drum,
   said shaping means operative to reshape said tube into a flat strip for winding upon the drum,
   said shaping means comprising a plurality of shaping guides passing said strip serially therethrough,
   and means including a cradle suspending said guides for vertical floating movement attendant to the cradle traversing.

8. In an irrigation apparatus comprising of an ambulatory support, a ribbon of water-impermiable material, a drum on the support for stowing said ribbon, means for converting said ribbon into a tube having a free end connectable to a source of water, means for shaping said ribbon into a trough in a predetermined location, water-distributing means on the support having an intake portion extending into said trough portion and including sprinkler means and pump means for discharging water upon the surrounding terrain, and means for regulating the amount of water pumped by said pumping means without loosing prime comprising of an air valve connected to said intake portion and having inlet means positioned at a predetermined elevation within the tube for communicating with the atmosphere to deliver a metered quantity of air into the pump means attendant to the water in the tube falling below a certain level.

9. The invention according to claim 8 and traction wheel means on the support, and
 means providing a correlated drive between said wheel means and the drum through said ribbon wound on the drum for winding said ribbon onto the drum as the carrier is driven toward an associated water source.

10. The invention according to claim 8 and traction wheel means incorporated into said support, and said drum being disposed behind said traction wheel means at one end of the support, and
 said pump means being mounted on the support in front of said wheel means in counterbalancing relation to said drum.

11. In an irrigation apparatus comprising of an ambulatory support, a ribbon of water-impermiable material, a drum on the support for stowing said ribbon, means for converting said ribbon into a tube having a free end connectible to a source of water, means for shaping said ribbon into a trough in a predetermined location, water-distributing means on the support having an intake portion extending into said trough portion and including sprinkler means and pump means for discharging water upon the surounding terrain, and means for regulating the amount of water pumped by said pumping means without loosing prime comprising of an air valve connected to said intake portion and having inlet means positioned at a predetermined elevation within the tube for communicating with the atmosphere to deliver a metered quantity of air into the pump means attendant to the water in the tube falling below a certain level, and traction wheel means on the support, and
 means providing a correlated drive between said wheel means and the drum through said ribbon wound on the drum for winding said ribbon onto the drum as the support is driven toward an associated water source,
 and said drive comprising of wheels in slidable frictional engagement with the ribbon wound on the drum.

12. The invention according to claim 11 and means for disconnecting said drive attendant to unwinding of said ribbon from the drum by disengaging said wheel means from the winding on the drum.

13. An irrigator comprising an ambulatory carrier, a strip-carrying drum mounted on a carrier, a strip of water-impermeable material wound on the drum having lateral edges with means for converting said strip into a water-holding tube, means for driving said drum for winding said strip thereon,
 said strip being unwindable from the drum,
 means for separating said edges attendant to the strip being wound onto the drum and securing said edges upon forming of the tube,
 means for driving said drum through engagement with the strip and imposing a tensile pull on the unwound portion of the strip to effect a tight and compact winding of the strip on the drum, said driving means comprising driven wheels in frictional engagement with the strip,
 means yieldably biasing said driven wheels in driving engagement with the strip wound on the drum,
 and a water supply source connectible to a tube end formed from the strip,
 said tensile pull maintaining said tube straight between te carrier and said water source, and
 means for steering the carrier in guided engagement with the tube.

14. The invention according to claim 13 and movable plug means positionable within said tube for retaining water therein.

15. The invention according to claim 12 and means for driving the carrier at a rate commensurate with rate of flow of water through said tube, and
 pumping means on the carrier for discharging water from the tube onto the surrounding terrain.

16. The invention according to claim 15 and means for correlating the pumping rate with the quantity of water in the tube to prevent depriming of said pumping means.

17. The invention according to claim 13 and said driving wheels for the drum being spaced circumferentially of the drum,
 ground drive wheels for the carrier, and
 a drive train between the ground wheels and the driving wheels correlating the rotation of the drum with the ground traversing speed of the ground traversing drive wheels.

18. The invention according to claim 15 and a conical plug within said tube at an end thereof remote from said water source for inhibiting water from spilling out of said end of the tube.

19. The invention according to claim 15 and means for correlating the flow of water from the tube with the discharge rate of said pumping means comprising a controlled air passage extending from said pumping means and having an inlet terminating at a predetermined elevation within the tube and operative to bleed air into the pumping means upon the level of the water in the tube dropping below the inlet end of the passage.

20. The invention according to claim 13 and means for shaping the strip into a trough form adjacent to said drum during winding of the strip onto the drum and for forming the strip into a tube attendant to unwinding of the strip from the drum.

21. An irrigator comprising a field traversing mobile unit including a discharge pump,
 means for delivering water from an associated source to said discharge pump,
 a supply pump at said source for supplying water from said source through said delivering means to said discharge pump, and
 means including signal transmission and receiving means for correlating the pumping rate of said supply pump to provide a supply of water at minimum pressure to the discharge pump and to maintain prime in the latter.

22. An irrigator comprising a fieldtraversing mobile unitincluding a discharge pump,
 means for delivering water from an associated source to said discharge pump,
 a supply pump at said source for supplying water from said source through said delivering means to said discharge pump, and
 means for correlating the pumping rate of said supply pump to provide a supply of water at minimum pressure to the discharge pump and to maintain prime in the latter, and said delivering means comprising a flexible tube, and a plug slidable within the tube, and said correlating means comprising of a pressure sensitive electronic signal sending unit on the plug and a receiving unit operatively connected to said supply pump for controlling the operation thereof.

23. The invention according to claim 22 and supplementary means for maintaining prime in the discharge pump comprising an air line having an air inlet disposed at a predetermined level within said delivering means and connected to the inlet of said discharge pump for bleeding air thereinto upon the water in said delivering means falling to a level exposing the inlet end of said line to the atmosphere for reducing the pumping rate of said discharge pump.

24. A field irrigator comprising a mobile carrier, a strip of water retaining material stowed on the carrier means for converting said strip into a tube for connection at one end to pressurized source of water, a supply pump at said source for filling said tube with water, a discharge pump on the carrier comprising inlet means having an inlet end extending into the other end of the tube, and a plug slidably fitted within the other end of said tube in a location beyond said inlet means with reference to said source for maintaining a water level within said tube sufficient to effect self-priming of said discharge pump.

25. An irrigator comprising an ambulatory support, a drum carried thereupon, means for driving the drum, a strip of material adapted to be wound on the drum and unwound therefrom, said strip having lateral edges, securing means on said lateral edges for releasably securing said edges to each other to form a tube, means for releasing said securing means to form a flat strip, guide means on the support comprising a series of guides sequentially passing the strip therethrough for unfolding the material to form a strip and for folding the material to form a tube as the material is wound onto and unwound from the drum, said guides having top and bottom portions engaging the top and bottom sides of the strip and having end portions interconnecting the top and bottom portions and providing means engaging the lateral edges of the strip to prevent the edges from creeping one ahead of the other and spiraling of the strip.

* * * * *